United States Patent [19]

Moore et al.

[11] Patent Number: 4,763,192
[45] Date of Patent: Aug. 9, 1988

[54] IMAGING APPARATUS

[75] Inventors: William T. Moore, Buckhurst Hill; Paul J. Robertson, Ilford, United Kingdom; Kenneth J. Wallace, Woodford Green, England

[73] Assignee: Rank Pullin Controls Limited, Loughton, England

[21] Appl. No.: 897,855

[22] Filed: Aug. 19, 1986

[30] Foreign Application Priority Data

Aug. 22, 1985 [GB] United Kingdom ............... 8521018

[51] Int. Cl.⁴ .................... H04N 5/33; H04N 3/08
[52] U.S. Cl. .................... 358/113; 358/206; 250/332; 250/334
[58] Field of Search ............. 358/113, 199, 206, 208, 358/180, 140, 284, 166, 167, 109; 250/332, 334, 340, 347, 353, 233, 234; 350/6.6, 6.8

[56] References Cited

U.S. PATENT DOCUMENTS

| 4,152,725 | 5/1979 | Beckmann | 358/109 |
| 4,347,530 | 8/1982 | Stetson | 358/113 |
| 4,358,789 | 11/1982 | Confer | 358/208 X |
| 4,419,692 | 12/1983 | Modisette et al. | 358/113 |
| 4,533,164 | 11/1985 | Labb | 358/163 |
| 4,551,752 | 11/1985 | Wall et al. | 358/113 |
| 4,644,407 | 2/1987 | Nixon | 358/113 X |

FOREIGN PATENT DOCUMENTS

| A20003182 | 7/1979 | European Pat. Off. . |
| A10006351 | 1/1980 | European Pat. Off. . |
| A10018856 | 11/1980 | European Pat. Off. . |
| A10077239 | 4/1983 | European Pat. Off. . |
| WO83/00968 | 3/1983 | PCT Int'l Appl. . |
| 1191500 | 5/1970 | United Kingdom . |
| 1455290 | 11/1976 | United Kingdom . |
| 1546827 | 5/1979 | United Kingdom . |
| 2007459 | 5/1979 | United Kingdom . |
| 1549168 | 7/1979 | United Kingdom . |
| 1588018 | 4/1981 | United Kingdom . |
| 2091440 | 7/1982 | United Kingdom . |
| 2110897 | 6/1983 | United Kingdom . |
| 2114396 | 8/1983 | United Kingdom . |
| 2144291 | 2/1985 | United Kingdom . |
| 2149258 | 6/1985 | United Kingdom . |

Primary Examiner—Howard W. Britton
Assistant Examiner—Victor R. Kostak
Attorney, Agent, or Firm—Saidman, Sterne, Kessler & Goldstein

[57] ABSTRACT

A twin polygon thermal imager is provided with a compensator for compensating for horizontal distortion in the image produced on a CRT. The distortion compensator applies an amount of correction which is determined, in each horizontal line, to compensate for the particular magnitude of the distortion in that line. The amount of correction needed is determined as a function of the angle between the rotational axis of the polygons and the particular facets thereof producing the particular video line. Compensation is achieved by adjusting the timing and the frequency at which digital video data is read-out from a signal store.

25 Claims, 4 Drawing Sheets

IMAGING APPARATUS

BACKGROUND

This invention relates to imaging apparatus and is particularly applicable to apparatus in which an image, or data representing an image, is formed by a scanning operation. The invention is especially applicable to thermal imaging apparatus.

Thermal imaging apparatus is known in which the thermal image of a scene is scanned optically across a photodetector, the signals from the photodetector are processed and the resulting processed signals applied to a CRT to produce a visible image of the scene. The scanning may be performed by first and second rotating or oscillating reflectors, such as a pair of rotating polygons. Reference may be made to UK Pat. No. 2,110,897 for an example of such a twin polygon scanner. Image distortion may arise in such apparatus.

PRIOR ART

European Pat. No. 93143 (Ericsson) contains a proposal for dealing with the distortion which may arise in apparatus of this type. In particular, different degrees of distortion arise in each horizontal scan line so that horizontal lines in the original scene are reproduced in the image with differing lengths. Ericsson proposes to solve the problem by delaying the read-out of digital image signals from time to time in each line and interpolating additional pixels into the resulting gaps.

The Ericsson proposal suffers from the problem that only a relatively coarse correction is achievable in practice. In particular, Ericsson proposes that the delays introduced should either be equal to one whole pixel period or one half pixel period so that distortions requiring delays of smaller fractions of a pixel period cannot be corrected. Theoretically, circuitry could be provided for introducing a range of delays from small fractions of a pixel to a whole pixel but this would involve substantial increase in complexity.

A further problem with the interpolation method proposed by Ericsson is that if a pixel is interpolated at a position coincident with an edge of an object contained in the image blurring of the edge results since the brightness of the interpolated pixel is obtained by averaging adjacent pixels.

Ericsson acknowledges that a possible way of correcting for the above discussed distortion would be to supply the picture elements (pixels) in the different lines with differing frequencies for each line but points out that this is possible only in theory because, in practice, it is difficult to obtain sufficiently constant and exact frequencies.

SUMMARY OF INVENTION

The object of the invention is to solve the above problems.

In order to solve these problems, the invention provides imaging apparatus, comprising optical image forming means for optically forming a first image, and electronic means for producing a second image defined by signals provided in a plurality of scan lines, said optical means and said electronic means being coupled together such that one of said images is producible from the other but with different amounts of distortion in different lines, said electronic means including conversion means for converting said signals between analogue form and digital form at any one of a plurality of discrete frequencies, and control means controlling said conversion means to vary the relative time periods during which said conversion is performed at different ones of said frequencies in each line as a function of the amount of said distortion in said line compensate for said distortion.

Thus, by varying the aforesaid relative time periods, the average frequency at which the conversion is carried out in each line may be finely adjusted so that corrections down to small fractions of a pixel period may be achieved. For example, in a preferred embodiment, two discrete frequencies are used having values such that if f is the magnitude of one of the frequencies, the magnitude of the other is 10f/11 and with such frequencies it is possible to achieve corrections down to one tenth of a pixel period. Further, since correction is achieved by varying the frequency of the conversion rate in the invention, rather than by interpolation, the problem of blurring of edges does not arise.

The invention is described further by way of example to the accompanying drawings in which.

Figure 1:
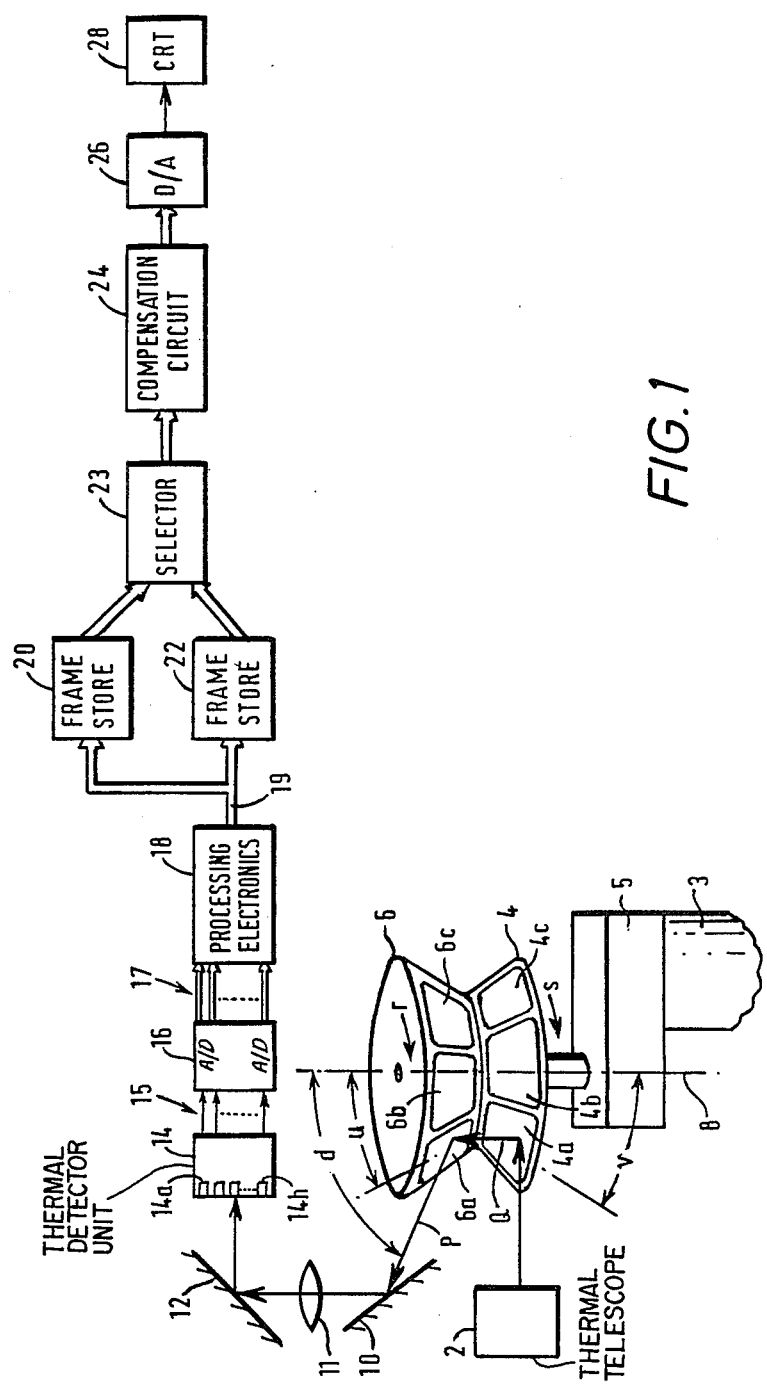
FIG. 1 is a diagram illustrating a preferred embodiment of the invention.

With reference to FIG. 1, a thermal imager comprises a thermal telescope 2, first and second coaxial polygon mirrors 4 and 6 which are rotatable about a vertical axis 8 by means of a motor 3 and transmission 5 which direct thermal energy via a mirror 10, a lens 11 and a further mirror 12 to a thermal detector unit 14 upon which the thermal energy is focussed by means of the telescope 2 and lens 11.

The lower polygon 4 has seven plane reflective facets 4a to 4g, of which three, namely 4a to 4c, can be seen in FIG. 1. Each facet is disposed at a different angle v to the axis 8 from the others. The polygon 6 has eight plane reflective facets 6a to 6h, of which three, namely 6a to 6c can be seen in FIG. 1. Each of the facets 6a to 6h is disposed at a different angle u to the axis 8. The polygon 4 is driven at an angular speed s and the polygon 6 is driven in the same direction at an angular speed r, where the ratio of r to s is 7:8. As is well known, with such an arrangement, the whole of the thermal image may be scanned relative to the detector unit, over a frame period.

Figure 2:
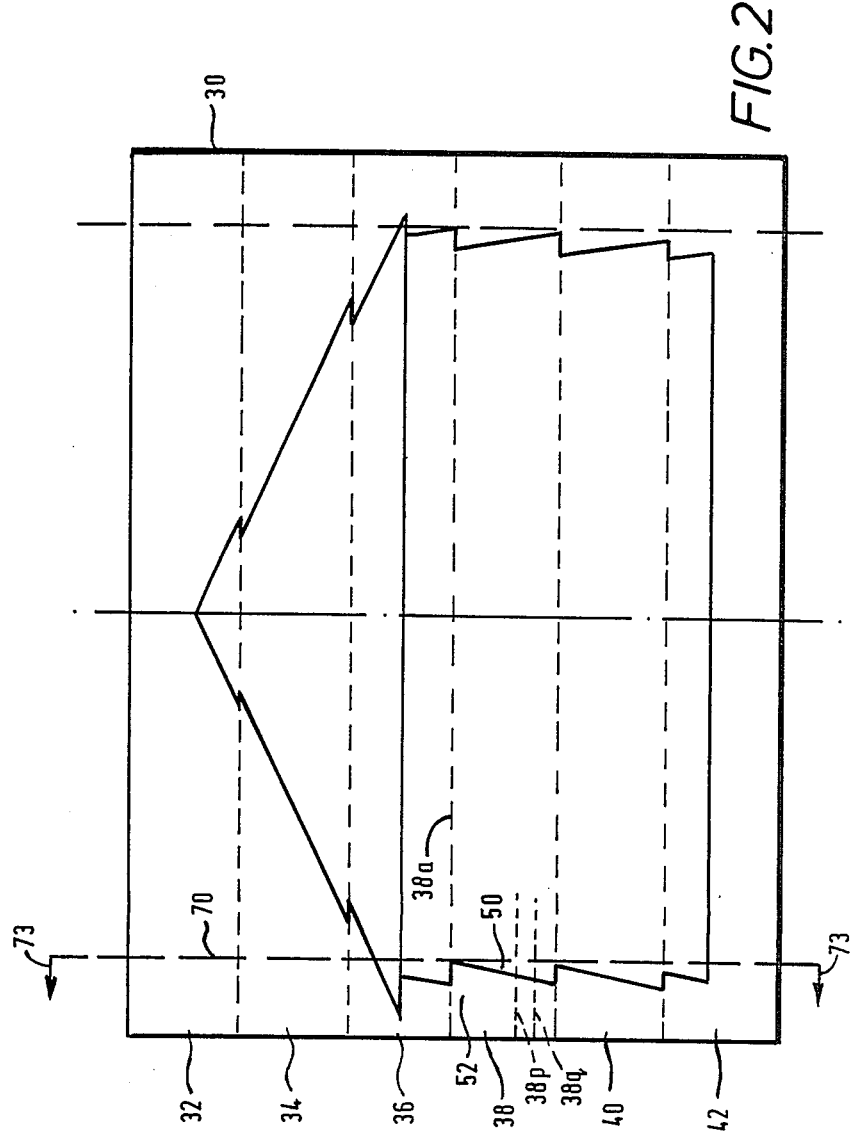
FIG. 2 is a diagram showing distortion on a CRT display, which distortion may be corrected in accordance with the invention.

The detector unit 14 comprises a number of photodetectors 14a to 14h, eight in this embodiment, so that for a single horizontal scan of the thermal image, eight adjacent video lines in a field are simultaneously produced. Each group of eight video lines is herein referred to as a "swathe". The outputs from the photodetectors are supplied in eight channels 15 to eight analog to digital converters 16a to 16h. The digital data output by the A/Ds 16a to 16h are supplied in eight digital channels 17, each supplying a stream of eight bit parallel binary numbers, to processing electronics 18, which output the digital data in a single channel 19, comprising eight bits in parallel which is connected to two frames stores 20, 22. The data from the frame stores 20, 22 is supplied via a selector circuit 23, a compensation circuit 24 and a digital-to-analog to converter 26 to a CRT 28 for display of an image thereon. FIG. 2 illustrates the screen 30 of the CRT and shows the image divided into six bands 32,34,36,38,40 and 42, each comprising a number of swathes (not individually shown). Bands 32 and 42 may each comprise six swathes and the remaining bands may each comprise eight swathes.

Scanners employing twin polygons 4,6 as indicated in FIG. 1 are well known and accordingly it is considered that the optical scanning operation need not be described in further detail. However, as is well known, the swathes are not output in their correct sequence by the detector unit 14. Consequently, in order to reorder the swathes so that conventional line-by-line scanning may be employed in the CRT 28, the first and second frame stores 20 and 22 shown in FIG. 1 are so arranged that while a given frame or part frame is being read into one of these stores with the swathes in the order supplied by the detectors 14, the frame or part frame previously stored in the other frame store is read out line-by-line by a selector 23, with the lines in the sequential order required by CRT 28.

Although the polygons 4 and 6 are rotated at constant speed, the angular velocity of the energy leaving the facets of the polygon 6 is a function of the angles to the axis 8 of the facets from which the energy is reflected. Accordingly, each combination of a facet from polygon 4 and a facet from polygon 6 produces a different horizontal scanning rate. Further, the rate at which the image scans across each detector is a function of the vertical position of the detector 14a at 14h since the different rays arriving at the different detectors 14a to 14h leave the facets of both polygons at different angles. As a consequence, vertical lines in the thermal image will be inclined to the vertical in the display as shown at 50, by way of example, in FIG. 2 and a discontinuity in the vertical line will arise if the line extends across the boundary between adjacent bands, as shown, by way of example, at 52, in FIG. 2. The sequence in which the photodetectors 14a to 14h produce the swathes will depend upon the angle selected for the facets of the polygons 4 and 6 and the distortion in the displayed image will vary according to this sequence and according to the angles. The distortion illustrated in FIG. 2 is typical of that which arises where the polygons are such that the swathes of each band 32 to 42 are produced by the detector 14 in sequence, but the bands are produced out of sequence, the sequence being corrected by the frame stores 20, 22 and the selector 23. Suitable values for the angles u and v for the facets of the polygons to produce this sequence are shown in the following Table I.

TABLE I

| Polygon 4 | | Polygon 6 | |
| --- | --- | --- | --- |
| Facet | v° | Facet | u° |
| 4a | 51.9233 | 6a | 37.5601 |
| 4b | 49.6156 | 6b | 35.8293 |
| 4c | 47.3079 | 6c | 34.0986 |
| 4d | 45.000 | 6d | 32.3678 |
| 4e | 42.6295 | 6e | 37.6322 |
| 4f | 40.3848 | 6f | 35.9032 |
| 4g | 38.0772 | 6g | 34.1707 |
| | | 6h | 32.4399 |

It will be seen from the above Table that the angles given are in degrees and they are listed in the order of the facets around the polygons.

Figure 3:
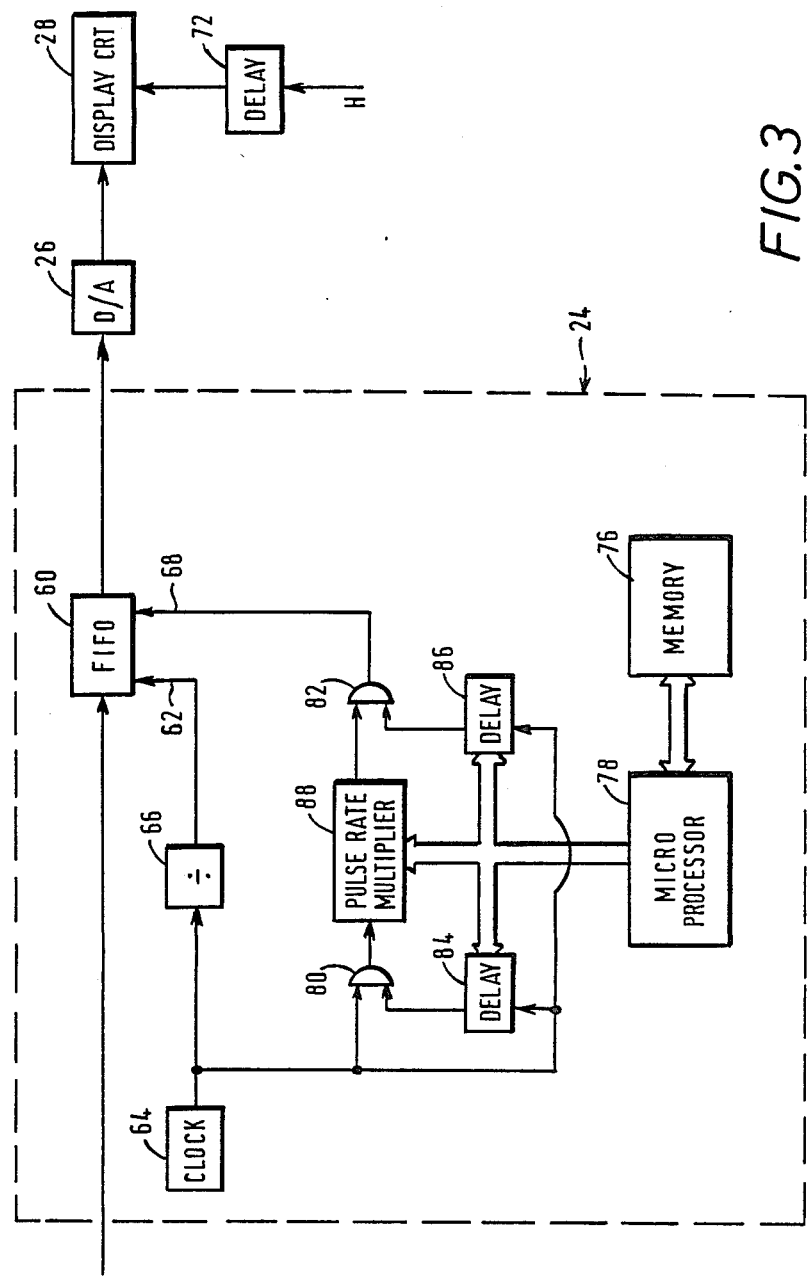
FIG. 3 is a block diagram of a compensation circuit included in the apparatus of FIG. 1.

Circuit 24 is provided to compensate for the above discussed distortion and, as shown in FIG. 3, the circuit 24 comprises a FIFO 60 which receives parallel binary data, for example 8-bit data, for each pixel at a clock rate which is the same as the rate at which the data is read out from the stores 20 and 22. The data is clocked into the circuit 60 by clock signals supplied to an input clock terminal 62 from an oscillator 64 and the division circuit 66. By way of example, the oscillator 64 may operate at 100 MHz and the division circuit 66 may divide this frequency by 10. An output clock terminal 68 of the FIFO 60 is supplied, for each line, with a train of read-out clock pulses the starting time of which is delayed by an amount dependent upon the line and the frequency of which is dependent upon the particular line. Thus, by way of example, zero delay may be applied to the read-out pulse train corresponding to the first line 38a of swathe 38 but successively increasing delays are applied to each pulse train for each successive line of swathe 38 so that, for example, line 38q is delayed by a greater amount than line 38p in order to bring each portion of the vertical line 50 into coincidence with an imaginary vertical line 70 shown in FIG. 2 and the frequency of each train is varied from one line to the next in order that the read-out lines are of equal length. As shown in FIG. 3, the horizontal sync pulses H applied to the CRT 28 are delayed by a delay device 72 selected to shift the imaginary line 70 to the left in the direction of arrow 73 as shown on FIG. 2 to bring this line approximately back into its correct position. By means of these varying delays and varying read-out frequencies, the distortion shown in FIG. 2 may be compensated for. When the apparatus is set up, the required delays and read-out frequencies are computed for each line, the required read-out frequency being proportional to the reciprocal of the angular velocity V of the ray scanning the particular detector producing the particular line. This angular velocity V may be calculated from the following formula:

$$V = 2r \cdot \sin(d+u) \cos u + 2s \cdot \sin(d+v-2u) \cos v$$

where u, v, r and s indicate the quantities hereinbefore assigned to them in the description of FIG. 1 and d is the angle between the ray P and the axis 8 as shown in FIG. 1 at the instant that the ray P and the ray Q, also shown in FIG. 1 are both in a plane parallel to the axis 8.

The required delay D is calculated in accordance with the following formula:

$$D = 0.5 L x f - 256$$

where L is the line period and f is the frequency calculated as above. The number 256 is equal to half the number of pixels in each line.

The computation of D will generally result in a delay comprising an integral number of pixel periods plus a fraction of a pixel period. This fraction may be converted to nanoseconds by dividing it by f and multiplying by 100 assuming a clock frequency of 10 MHz.

Calculation of the required frequencies is preferably made by computer. Control data representing this frequency, or an approximation thereof, for each line is then stored in a memory 76 illustrated in FIG. 3 together with data representing the required delay for each line.

A microprocessor 78 reads the data for each line from the memory 76 and, by means of first and second gates 80 and 82 controlled respectively by delay control circuits 84 and 86, delays the pulse train applied to the input 68 at the beginning of each line by the appropriate amount. Conveniently, the gate 82 and delay control circuit 86 determine a delay representing a fixed number of pixel periods and the gate 80 and delay control circuit 84 provide a delay corresponding to a fraction of a pixel. Microprocessor 78 also controls a pulse multiplier circuit 88 which receives clock pulses from the oscillator 64 and divides them by an appropriate amount to output the pulse train at the required frequency for application to read-out clock terminal 68 of circuit 60.

Figure 4:
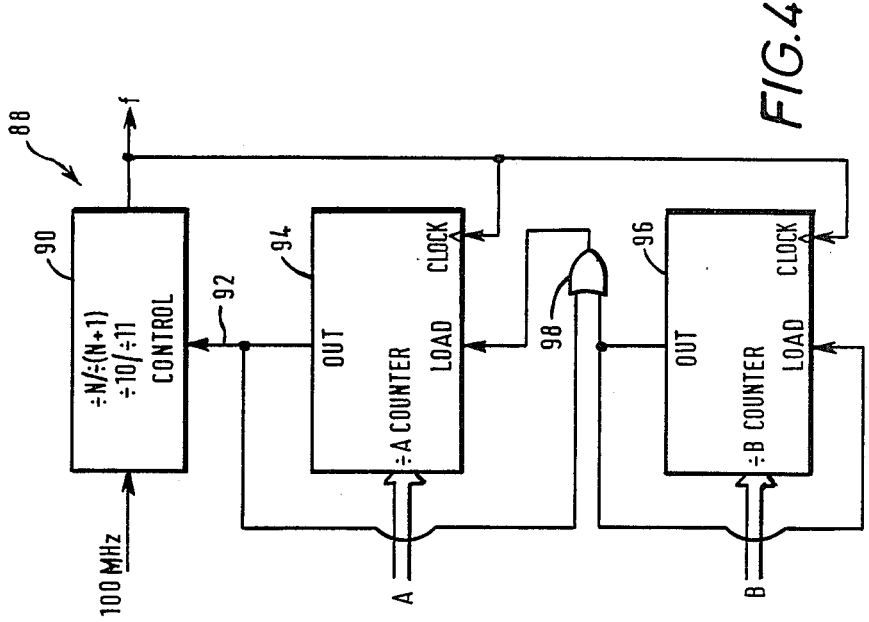
FIG. 4 is a block diagram of a part of the circuit of FIG. 3.

As illustrated in FIG. 4, the pulse rate multiplier 88 comprises a division circuit 90 which has a control input 92 and is operable to divide by 10 or 11 according to the presence or absence of a control signal on input 92. The frequency applied to the input 68 is not constant through each line but is varied between two values, according to whether the circuit 90 is dividing by 10 or by 11, by the application of control signals to the input 92, but these control signals are arranged so that the average frequency corresponds to the frequency required at input 68. To achieve this, a first counter 94 receives a number A from the computer 78 and counts the output pulses from the circuit 90. During the time that the counter 94 is counting, the signal applied to input 92 is such that circuit 90 is dividing by 10. When the number of pulses counted by the counter 94 is equal to number A, a signal is momentarily applied to input 92 to cause the counter to divide by 11 for one pulse period and thereafter the signal on input 92 returns to its previous condition and the counter 94 begins to count again up to the number A. Thus, each time A pulses have been output by the circuit 90, the denominator of the division is changed from 10 to 11 for one pulse period. Thus, the magnitude of the number A determines the average frequency of the pulse train output by circuit 90 and the periods for which the frequency of the pulse train is changed by changing the denominator between 10 and 11 are distributed throughout the line thus further contributing to image quality. To obtain even finer control, a second counter 96 is included which counts a number B also supplied by the microprocessor 78. B is greater than A. The counter 96 counts pulses output by the circuit 90 and when the number B is reached resets the counter 94 by supplying a signal thereto through a gate 98. Thus, in this embodiment, the numbers A and B for each line are stored in the memory 76 to define the required frequencies.

Figure 5:
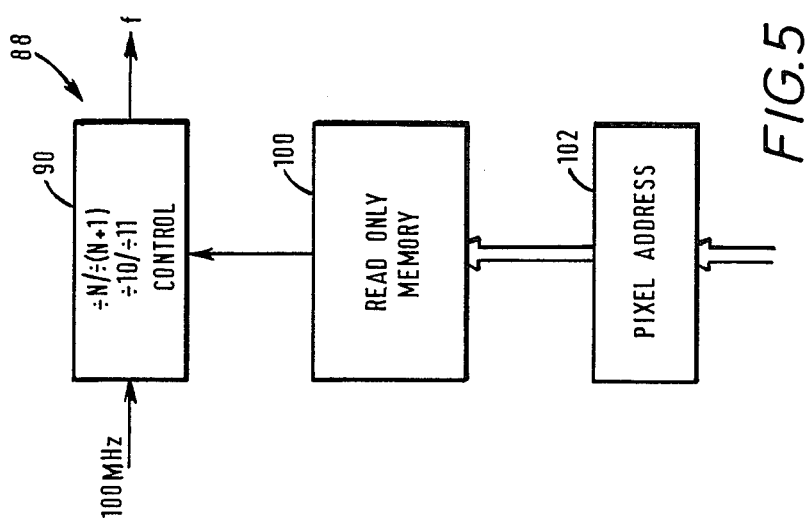
FIG. 5 shows an alternative circuit which may be used instead of that shown in FIG. 4.

An alternative circuit for achieving similar results to that achieved by the circuit of FIG. 4 is shown in FIG. 5. In this embodiment, data representing the required frequencies is not stored in memory 76. Instead, a read-only memory 100 stores an "0" or a "1" for each pixel thereby determining for each pixel whether the circuit 90 divides by 10 or by 11. Microcomputer 78 causes the read-only memory to supply the "0" or "1" stored for each pixel by supplying pixel address data to a circuit 102.

Various modifications are possible within the scope of the invention. For example, although in the embodiments described with reference to the drawings the circuitry 24 in conjunction with the digital-to-analogue converter 26 has achieved correction by varying the digital-to-analogue conversion rate or frequency i.e. the frequency at which digital signals are applied to the D/A converter 26, it would also be possible within the scope of the invention to achieve correction by varying an analogue-to-digital conversion frequency i.e. the sampling frequency. Thus, for example, it would be possible to adjust the conversion rate (sampling frequency) of the analogue-to-digital converter 16 shown in FIG. 1 in order to achieve correction of distortion, this variation being achieved by varying the relative time periods during which the conversion is performed at different ones of discrete frequencies in each line.

Although the invention has been described with reference to thermal imaging systems, it is also applicable to other imaging systems. One particular example of an alternative system to which the invention may be applied is a projection system for projecting images from a CRT onto a screen at an angle to the projector.

Although the invention has been described with reference to twin polygon thermal scanners, it may also be applied to other forms of thermal scanner in which distortion arises.

The invention, in addition to residing in the apparatus and method illustrated in the accompanying drawings, resides in a computer programmed to compute the frequency or frequency correction data and/or delay required for each line to correct for the distortion.

Although, in the illustrated embodiment, a separate correction or compensation circuit 24 has been shown, it would be possible to put the invention into practice by varying the read-out frequency from the frame stores 20 and 22 to compensate for the distortion which has been described.

Although in the embodiments shown, frame stores have been provided for reordering the image signals provided by the detectors, it is possible within the scope of the invention to eliminate this reordering and instead to utilise a display in which the lines are scanned in the order in which line data is output by the detector.

Although FIG. 3 shows a delay circuit 72 for delaying the horizontal sychronising pulses of the CRT, this is not essential; a similar correction may be obtained by other means, or the correction may be eliminated altogether.

Although the pulse rate multiplier circuit has been illustrated as utilising the denominators 10 and 11, other denominators may be employed.

In addition to the possibilities for compensating for distortion already mentioned, there are other possibilities. For example, the processing electronics include swathe stores and it would be possible to apply the compensation by adjusting the read-in rate (A/D conversion rate) or read-out rate (D/A conversion rate) of the swathe stores.

It should be noted that although FIG. 2 primarily illustrates the distortion arising near the edges of the picture, distortion also takes place towards the mid-portions of the picture but to a lesser extent. Further, there will be a vertical line at approximately the centre of the picture along which no distortion at all takes place. The compensation means described with reference to the drawings effects correct compensation throughout the whole width of the picture.

Aspect Ratio Correction

A further form of distortion which may arise in the type of apparatus illustrated in the drawings of the present application, or other imaging apparatus, is in aspect ratio. In particular, the aspect ratio (the ratio of the height to the width) of the reproduced image may be reduced. Accordingly, with a view to avoiding this problem, an alternative aspect of the invention provides imaging apparatus, preferably thermal imaging apparatus, having means for producing video signals in a plurality of lines, preferably in a swathe formed by a number of photodetectors which are scanned simultaneously by the image, and interpolation means for increasing the number of video lines. Preferably, said interpolation means derives the additional video lines from the information in the adjacent lines. This is preferably done following conversion of the video signals to digital form. It is particularly preferable that the interpolation be performed either in the processing electronics 18 or in the frame stores 20 and 22 or on the data leaving the frames stores 20 and 22. Preferably the interpolation is performed by hardware rather than software.

The following Table II indicates a preferred method of achieving a suitable interpolation in which an eight line input swathe is converted to an eleven line output swathe.

TABLE II

| A | B | C | D |
|---|---|---|---|
| 1 | 1.0 | 1 | L1 |
| 2 | 1.7 | 1.75 | L2−0.25(L2−L1) |
| 3 | 2.4 | 2.5 | L3−0.5(L3−L2) |
| 4 | 3.1 | 3.0 | L3 |
| 5 | 3.8 | 3.75 | L3−0.5(L5−L3) |
| 6 | 4.5 | 4.5 | L5−0.5(L5−L4) |
| 7 | 5.2 | 5.25 | L6−0.75(L6−L5) |
| 8 | 5.9 | 6.0 | L6 |
| 9 | 6.6 | 6.5 | L7−0.5(L7−L6) |
| 10 | 7.3 | 7.25 | L8−0.75(L8−L7) |
| 11 | 8.00 | 8.00 | L8 |

In the above Table II, column A indicates the line number in the output swathe.

Column B indicates the ideal gradation to be achieved using interpolation in accordance with the invention. The figures given in column B are arrived at by assuming a grey scale of from 1 to 8 and then dividing this into 11 equal steps.

Column C approximates the figures given in column B to the nearest quarter.

Column D indicates the computations performed by the apparatus on the received 8 line video signal (in digital form preferably) to provide the 11 line output video signal. In column D, L1, L2 . . . L8 refer to the values of the eight incoming signal lines.

Thus it can be seen from the above table that output line 1 is derived directly from input line 1 without any change. Output line 2 is derived by subtracting from input line 2 one quarter of the difference between input lines 2 and 1, etc.

It should be understood that the afore-described apparatus and method of aspect ratio correction may be employed in combination with or separately from the other features of the apparatus illustrated in the drawings and herein otherwise described.

I claim:

1. Imaging apparatus, comprising;
optical image forming means for optically forming a first image; and
electronic means for producing a second image defined by signals provided in a plurality of scan lines, said optical means and said electronic means being coupled together such that one of said images is producible from the other but with different amounts of distortion in different lines;
said electronic means including conversion means for converting said signals between analogue form and digital form at any one of a plurality of discrete frequencies, and control means controlling said conversion means to vary the relative time periods during which said conversion is performed at different ones of said frequencies in each line as a function of the amount of said distortion in said line to compensate for said distortion.

2. Apparatus according to claim 1, wherein said conversion means includes a signal storage device for storing said signals in digital form, read out means controlled by said control means for reading out said signals from said storage device at any one of said plurality of discrete frequencies, and a digital-to-analogue converter which receives said read out signals at said discrete frequencies and converts them to analogue form.

3. Apparatus according to claim 1, wherein there are two said discrete frequencies.

4. Apparatus according to claim 3, wherein the time periods during which the different frequencies are employed are distributed substantially uniformly within the period of the line.

5. Apparatus according to claim 4, wherein the control means is operable to perform said conversion at a first said frequency for a predetermined number of pixels, thereafter to perform said conversion at the second frequency for a fixed number of pixels and then to resume conversion at said first frequency, and wherein said control means is operable to vary said predetermined number to effect said compensation.

6. Apparatus according to claim 5, including means to count a selected number of pixels greater than the sum of said predetermined number and said fixed number and to restart the counting of said predetermined number upon counting to said selected number, said control means being operable to adjust said selected number for effecting said compensation.

7. Apparatus according to claim 3, wherein the control means includes a pulse source providing pulses at a frequency F and division means arranged to produce from said source further pulses at said discrete frequencies of F/10 and F/11.

8. Apparatus according to claim 7, wherein said control means varies said relative time periods by providing a variable number of pulses at frequency F/10 followed by a single pulse at frequency F/11.

9. Apparatus according to claim 1 wherein the control means comprises data storage means for storing data indicating the conversion frequency to be used for each portion of each line and means for causing said conversion to be performed at a frequency in accordance with the data stored in said data storage means.

10. Apparatus according to claim 1, including a display device which produces said second image in a plurality of line scans, and delay means for introducing a delay between starting said conversion at the beginning of each line and the beginning of a corresponding line scan in said display device, said delay means providing different delays in different lines as a function of the distortion in the corresponding line of said first image.

11. Apparatus according to claim 10 wherein said delay means comprises first and second delay devices, one of which is operable to delay said conversion by an integral number of pixel periods and the other of which is operable to delay said conversion by a fraction of a pixel period.

12. Apparatus according to claim 1, including transducer means, and wherein said first image is supplied to said transducer means for producing said electrical signals from said first image.

13. Apparatus according to claim 12 wherein said optical means includes first and second polygonal mirrors coaxially arranged, each having its facets at different angles to the axis of rotation of the polygons and one of the polygons having more facets than the other, to achieve horizontal and vertical scanning of the transducer by the first image.

14. Apparatus according to claim 13, wherein said first image is a thermal image.

15. Apparatus according to claim 12, wherein said first image is a thermal image and wherein said transducer means comprises a plurality of thermal detectors each arranged to detect a different horizontal line in the thermal image, the number of said detectors being substantially less than the number of said horizontal scan lines, so that said electrical signals are formed in swathes, each comprising a number of lines making up a horizontal band in the second image.

16. Apparatus according to claim 15, including delay means for introducing a successively larger delay at the beginning of said conversion at each successive line in each swathe, and wherein said control means provides a successively higher average conversion frequency for each successive line of each swathe.

17. Apparatus according to claim 16, including a display device operable to produce said second image in a plurality of line scans and means for providing horizontal synchronising pulses for initiating each line scan in said display device, said display device having a delay circuit which delays said horizontal synchronising pulses by a time substantially equal to the maximum delay applied by said delay means.

18. Apparatus according to claim 1, wherein the optical image forming means comprises optical scanning means for scanning a field of view horizontally and vertically and operable to produce the first image as a thermal image containing aspect ratio distortion; and the electronic means includes a plurality of thermal detectors arranged to be scanned by said thermal image and to produce video signals in first swathes each having a number of lines dependent upon the number of said thermal detectors, and interpolating means operable to process said signals in said first swathes to produce by interpolation further swathes of video signals containing more lines than said first swathes to correct said aspect ratio distortion.

19. A thermal imager according to claim 18, including digitising means for digitising said signals in said first swathes, said interpolating means being arranged to perform said interpolation on said digitised signals.

20. Imaging apparatus comprising
optical image forming means for optically forming a first image,
transducer means for producing electrical signals from said first image,
the image forming means including a first polygonal mirror having seven facets and a second polygonal mirror having eight facets, the said mirrors having coaxial axes of rotation and the facets having the angles to the axes of rotation specified in the following table for achieving horizontal and vertical scanning of the transducer by the first image,

TABLE

| ANGLE RELATIVE TO THE AXIS OF ROTATION | |
|---|---|
| First Mirror | Second Mirror |
| 51.9233 | 37.5601 |
| 49.6156 | 35.8293 |
| 47.3079 | 34.0986 |
| 45.0000 | 32.3678 |
| 42.6295 | 37.6322 |
| 40.3848 | 35.9032 |
| 38.0772 | 34.1707 |
| — | 32.4399 | and, electronic means for producing a second image defined by signals provided in a plurality of horizontal scans, said second image having different amounts of distortion in different horizontal scans, the electronic means including means for correcting the said distortions.

21. Apparatus according to claim 20 wherein the correcting means comprises means for delaying the signals defining the horizontal scans by different amounts for different horizontal scans.

22. Apparatus according to claim 21, wherein the correcting means comprises means for altering lengths of at least portions of the horizontal scans defined by the said signal by different amounts for different horizontal scans.

23. Apparatus according to claims 20, wherein said electronic means including conversion means for converting said signals between analog form and digital form at any one of a plurality of discrete frequencies, and control means controlling said conversion means to vary the relative time periods during which conversion is performed at different ones of said frequencies in each line as a function of the amount of said distortion in said line to compensate for said distortion.

24. Apparatus according to claim 20, wherein the facets of the polyognal mirrors have the angles specified in the TABLE in the order specified in the TABLE.

25. Imaging apparatus, comprising optical image-forming means for optically forming a first image, transducer means for producing electrical signals from said first image,
the image-forming means including a first polygonal mirror having seven facets and a second polygonal mirror having eight facets, said mirrors having coaxial axes of rotation and the facets being angled to the axes of rotation achieving horizontal and vertical scanning of the transducer by the first image,
the facets of the first polygonal mirror being angled to the axis of rotation thereof by
about 45° ± about 2.3 n where n=0, 1, 2, and 3, the facets of the second polygonal mirror being in two sets of four, one set being angled to the axes of rotation thereof by
about 37.6° minus about $\frac{3}{4} \times n \times 2.3$ where n=0, 1, 2, and 3, the facets of the other set being angled to the axes of rotation thereof by the same amounts as the said one set plus an offset for achieving interlacing, and electronic means for producing a second image defined by signals provided in a plurality of horizontal scans, said second image having different amounts of distortion in different horizontal scans, the electronic means including means for correcting the said distortion.

* * * * *